(12) United States Patent
Balaji et al.

(10) Patent No.: US 11,726,522 B2
(45) Date of Patent: Aug. 15, 2023

(54) SLIDING INPUT DEVICE COVER

(71) Applicant: Apple Inc., Cupertino, CA (US)

(72) Inventors: Santhana K. Balaji, Fremont, CA (US); Guangtao Zhang, San Francisco, CA (US); John Raff, Menlo Park, CA (US); Ryan P. Brooks, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/373,180

(22) Filed: Jul. 12, 2021

(65) Prior Publication Data

US 2021/0341967 A1    Nov. 4, 2021

Related U.S. Application Data (63) Continuation of application No. 16/844,694, filed on Apr. 9, 2020, now Pat. No. 11,092,997.

(60) Provisional application No. 62/906,572, filed on Sep. 26, 2019.

(51) Int. Cl.
*G06F 1/16* (2006.01)

(52) U.S. Cl.
CPC ............ *G06F 1/1624* (2013.01); *G06F 1/169* (2013.01); *G06F 1/1616* (2013.01); *G06F 1/1643* (2013.01); *G06F 1/1654* (2013.01); *G06F 1/1681* (2013.01)

(58) Field of Classification Search
CPC combination set(s) only.
See application file for complete search history.

(56) References Cited

U.S. PATENT DOCUMENTS

| | | | |
|---|---|---|---|
| 5,734,548 A | 3/1998 | Park | |
| 5,742,475 A | 4/1998 | Riddiford | |
| 6,028,768 A | 2/2000 | Cipolla | |
| 6,768,635 B2 | 7/2004 | Lai et al. | |
| 6,816,365 B2 | 11/2004 | Hill et al. | |

(Continued)

FOREIGN PATENT DOCUMENTS

| | | |
|---|---|---|
| CN | 103677121 A | 3/2014 |
| CN | 203799369 U | 8/2014 |

(Continued)

OTHER PUBLICATIONS

"360 Degree Adjustable Stand Case with Slide-out Keyboard for iPad 2/3/4", iPad case with slide-out keyboard, DIYTrade.com, Accessible at: https://www.diytrade.com/china/pd/12127339/360_Degree_Adjustable_Stand_Case_with_Slide_out_Keyboard_for_iPad_2_3_4.html, Available at least as early as Sep. 26, 2019, n/a.

(Continued)

*Primary Examiner* — Lisa Lea-Edmonds
(74) *Attorney, Agent, or Firm* — Dorsey & Whitney LLP (57) ABSTRACT

A computing system includes an electronic device, a cover or case for the electronic device, and an input device that is slidably movable yet attached to the cover or case. By positioning the electronic device on top of the input device, rotation of the electronic device which changes its vertical viewing angle also translates the input device. These can provide improved overall possible viewing angle adjustability, increased system stability at high viewing angles, laptop-like opening and closing behavior, lighter weight, and implementation using low-cost components.

19 Claims, 8 Drawing Sheets

(56) References Cited

U.S. PATENT DOCUMENTS

| | | |
|---|---|---|
| 6,870,730 B2 | 3/2005 | Riddiford |
| 7,355,843 B2 | 4/2008 | Riddiford |
| 7,630,195 B2 | 12/2009 | Lin |
| 7,886,903 B1 | 2/2011 | Wurzelbacher, Jr. et al. |
| 7,907,393 B2 * | 3/2011 | Sellers .................. G06F 1/1664 |
| | | 345/169 |
| 8,050,017 B2 | 11/2011 | Riddiford |
| 8,358,513 B2 * | 1/2013 | Kim ..................... G06F 1/1632 |
| | | 361/810 |
| 8,837,131 B1 | 9/2014 | Colby et al. |
| 10,289,176 B1 | 5/2019 | Chen et al. |
| 10,296,055 B2 * | 5/2019 | Delpier ................. G06F 1/1681 |
| 10,761,571 B1 | 9/2020 | Cooper et al. |
| 11,016,533 B1 * | 5/2021 | Takahashi ............. G06F 3/0202 |
| 11,108,424 B2 * | 8/2021 | Schooley ................ H04B 1/385 |
| 11,334,112 B2 * | 5/2022 | Chen ..................... G06F 1/1616 |
| 2003/0142469 A1 | 7/2003 | Ponx |
| 2004/0145862 A1 | 7/2004 | Hill et al. |
| 2005/0200608 A1 | 9/2005 | Ulla et al. |
| 2011/0023272 A1 | 2/2011 | Huang |
| 2011/0188187 A1 | 8/2011 | Barnett et al. |
| 2013/0069878 A1 | 3/2013 | Li |
| 2014/0016257 A1 | 1/2014 | Matsuoka |
| 2014/0071604 A1 | 3/2014 | Bates et al. |
| 2014/0071607 A1 * | 3/2014 | Frinak .................. G06F 1/1628 |
| | | 361/679.09 |
| 2014/0075214 A1 | 3/2014 | Spollen |
| 2014/0291176 A1 | 10/2014 | Chung |
| 2015/0157103 A1 | 6/2015 | Simon |
| 2017/0005689 A1 | 1/2017 | Smith et al. |
| 2019/0294212 A1 * | 9/2019 | Ohishi .................. G06F 1/1669 |
| 2020/0301480 A1 * | 9/2020 | Miller ..................... E05D 11/00 |
| 2021/0391885 A1 * | 12/2021 | Schooley ............. H04B 1/3888 |
| 2022/0060210 A1 * | 2/2022 | Schooley ................ H04M 1/04 |

FOREIGN PATENT DOCUMENTS

| | | |
|---|---|---|
| CN | 106879205 A | 6/2017 |
| CN | 107006985 A | 8/2017 |
| WO | 2015034719 A1 | 3/2015 |

OTHER PUBLICATIONS

"Keyboard Case for Apple iPad 2/3/4, iPad mini1/2/3/4, Ipad Mini5 2019, Ipad Air1&Air2 &Pro9.7 & 2017 iPad &2018, iPad Pro10.5, iPad Pro12.9 (2015/2017),iPad Pro11", iPad Folding Leather Folio Cover with Removable Bluetooth Keyboard Tablet iPad Folding Leather Folio Cover with Removable Bluetooth Keyboard, Lazada.com, Accessible at: https://www.lazada.com.ph/products/keyboard-case-for-apple-ipad-234-, ipad-mini1234-ipad-mini5-2019-ipad-air1air2-pro97-2017-ipad-2018-ipad-pro105-ipad-pro129-20152017ipad-pro11-ipad-folding-leather-folio-cover-with-removable-bluetooth-keyboard-tablet-i290080080-s469658911.html, Available at least as early as Sep. 26, 2019.

* cited by examiner

SLIDING INPUT DEVICE COVER

CROSS-REFERENCE TO RELATED APPLICATION(S)

This is a continuation of U.S. application Ser. No. 16/844,694, filed 9 Apr. 2020, and entitled "SLIDING INPUT DEVICE COVER," which claims priority to U.S. Provisional Patent Application No. 62/906,572, filed 26 Sep. 2019, and entitled "SLIDING INPUT DEVICE COVER," the entire disclosures of which are hereby incorporated by reference.

FIELD

The present disclosure generally relates to interfaces for electronic devices. In some specific examples, the present embodiments relate to keyboards and covers for touch screen devices.

BACKGROUND

Many electronic devices have keyboards and related devices to receive input and interaction from users. These electronic devices include computers, such as personal computers, tablet computers, and smartphones, and other "smart" devices, such as media players, video and audio equipment, vehicle consoles, home automation controllers, and related devices. Keyboards and other interface devices are designed with buttons or keys that are pressed by users to generate input signals for a processor or controller. These devices are often designed to provide a controlled amount of resistance to the user's fingertips in order to give tactile feedback as the user presses a button or key. The feel, sound, cost, and size of each button or key are tightly controlled to efficiently provide a desired user experience. Although some keyboards are "virtual," such as software keyboards displayed on a touchscreen device, it can be beneficial to provide key travel, or movement of the keys, to help the user more easily feel, see, and hear when and where a key is pressed and to provide an overall more satisfying interaction with the device.

Providing this type of key or button can come with costs. Touchscreen devices that do not have a built-in mechanical keyboard can be connected to a peripheral keyboard or a keyboard case or cover, but those devices generally can have keys that are awkwardly sized, can be covered by the touchscreen device, require batteries or internal weights to counterbalance the weight of the touchscreen device, require two hands to operate, and are poorly adjustable. Thus, there are many challenges and areas for improvements in interface devices.

SUMMARY

One aspect of the present disclosure relates to a computing system comprising an electronic device having a rear surface, a case having a back portion and a bottom portion joined by a hinge, with the back portion being mounted to the rear surface of the electronic device, and an input device in electronic communication with the electronic device and contacting the electronic device and the bottom portion of the case. Rotation of the electronic device relative to the input device can induce lateral translation of the input device relative to the hinge.

In some embodiments, the electronic device is rotatable relative to the input device between a first position and a second position, and a center of gravity of the electronic device moves parallel to a direction of translation of the input device upon rotation of the electronic device relative to the input device. The electronic device can also comprise a display, wherein the case and input device are movable relative to each other between an open configuration in which the display is exposed and a closed configuration in which the display is covered by the case or the input device. The electronic device can be selectively attachable to and detachable from the input device. The electronic device can be pivotally mounted to the input device.

The position of the input device relative to the hinge can be continuously adjustable within a range of relative positions, the electronic device being stable across an entirety of the range of relative positions. The range of relative positions can include a first position wherein the electronic device is at an about 120-degree angle relative to the input device and a second position wherein the electronic device is at an about 135-degree angle relative to the input device. The input device can be movable between a locked position relative to the bottom portion and an unlocked position relative to the bottom portion as a result of mounting the electronic device to the input device.

Another aspect of the disclosure relates to a computer cover comprising a back panel to mount to an electronic device, a bottom panel joined to the back panel by a hinge, with the bottom panel having an inner surface, and an input device mounted to the inner surface of the bottom panel and configured to laterally translate relative to the hinge while mounted to the inner surface.

In this cover, the back panel can include a mountable portion to mount to the electronic device and a rotatable portion to connect the mountable portion to the hinge, with the rotatable portion being connected to the mountable portion by a second hinge. The input device can comprise length and width dimensions less than or equal to length and width dimensions of the bottom panel. The input device can comprise a recess in which the electronic device can reside and can be mountable to the bottom panel in at least two different relative positions. The hinge can be a compliant mechanism. The back panel can be movable into a face-to-face orientation with the input device.

Yet another aspect of the disclosure relates to an electronic device cover comprising a first panel configured to be mounted to a rear surface of an electronic device, a second panel connected to the first panel at a hinge, and an input device mounted to, positioned over, and translatable relative to the second panel between a first position covering a first proportion of the second panel and a second position covering a second proportion of the second panel, with the second proportion being smaller than the first proportion.

In the second position, a portion of the input device can extend laterally away from an edge of the second panel. The input device can be further from the hinge in the second position relative to the first position. The input device can comprise a keyboard and a trackpad surface. The input device can be slidable between the first position and the second position.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the field of tablet computers and related electronic devices, it can be desirable to include a keyboard, track pad, and related input devices in order to give the tablet computer additional user interface functionality similar to a laptop or notebook computer. Conventionally, tablet computers are fitted with cases that include a keyboard or similar feature to protect the tablet in addition to adding such functionality. However, in many cases, using the tablet computer with a keyboard case is awkward and compromising for the user. It can be difficult for the user to find a comfortable viewing angle while the tablet computer is in a typing configuration because the cases only provide a limited number of stable viewing positions. Many do not provide any stability at high viewing angles (e.g., about 120-135 degrees or more relative to a horizontal support surface). For existing cases that provide more adjustability, increasing the viewing angle of the tablet computer tends to make the tablet computer and case assembly increasingly unstable as the tablet computer rotates to greater and greater viewing angles because the center of gravity of the device moves rearward, away from the user, and behind the support surfaces provided by the case. In order to counteract this effect, the cases and keyboards are often required to use heavy or expensive mechanical components such as friction hinges and counterbalance weights. In some cases, functionality and ease of use are sacrificed, such as by removing the track pad or by making the keyboard uncomfortably small, in order to ensure device stability while at high viewing angles.

Aspects of the present disclosure relate to a cover or case for an electronic device, such as a tablet computer, wherein the input device is slidably or translatably mounted to a folio (or similar paneled and hinged case or enclosure structure) that mounts to (or that is part of) the electronic device. The electronic device is movable between a stowed or closed position and an opened or viewing position. In the open position, a panel of the case can contact the rear surface of the electronic device, and a bottom edge or bottom surface of electronic device can be supported by and in contact with a top surface of the input device. Rotation of the electronic device while in this configuration can cause sliding or translating movement of the input device relative to the paneled structure. In other words, rotation of the electronic device can apply a horizontal force against the input device that causes it to translate along a panel of the case or cover that is on a support surface. Similarly, application of a horizontal force to the input device can induce rotation of the electronic device due to a connection, attractive force, or contact between the electronic device and the top of the input device.

Embodiments of the present disclosure can enable substantially infinite adjustability of the viewing angle of the electronic device (within a range of viewing angle limits or boundaries). In all of those viewing angles, the electronic device can be positioned relative to the input device in a manner that leaves the interactive portions of the input device completely exposed, uncovered, and accessible to the user, even while the device is adjusted. Furthermore, the electronic device and case assembly become more stable as the viewing angle is increased because the center of gravity of the electronic device moves forward as the input device moves forward (i.e., away from the hinge that joins a back panel and bottom panel of the folio). In other words, the center of gravity moves in the same forward direction as the input device translates relative to the bottom portion of the case or cover. Thus, the center of gravity of the electronic device can be described as moving parallel to a direction of translation (and with the same polarity of direction) of the input device upon rotation of the electronic device relative to the input device. For example, if the input device translates in a positive X-direction, the center of gravity of the electronic device also moves parallel to the X-axis in an at least partially positive X-direction (rather than in a negative X-direction) due to having the same polarity as the translation direction of the input device.

Therefore, embodiments of the present disclosure can provide laptop-like input device functionality to a tablet computer using relatively inexpensive and lightweight materials. In some embodiments, the keyboard and trackpad can both be provided on the input device without the input device having larger width and length dimensions than the tablet computer itself when the case, computer, and input device are all in a stowed configuration. The input device can be stowed in a safe and compact manner when it is not used. The positioning of the center of gravity of the electronic device over the bottom portion of the case also reduces or eliminates the need for counterbalance weights in the case or friction preload in the hinges of the case.

Additionally, moving the tablet computer and input device into a stowed position can be performed using a single-handed closing operation, similar to closing a laptop computer. In other words, when the electronic device is in an open configuration and has its bottom end contacting a retention surface on the top of the input device, a single force applied to the top end of the electronic device (i.e., a force that causes the electronic device to rotate about the bottom surface or about the interface between the electronic device and the input device) can cause the electronic device to rotate in a manner that reduces the viewing angle and, eventually, detaches or dismounts the electronic device from the top surface of the input device (while simultaneously moving the input device rearward into a stowed position) and also moves a front or display surface of the electronic device into the closed position where it faces the input device. Thus, the computing system can be moved into a closed configuration using the same type of arm motion that a user applies to close a laptop computer by turning the display of the laptop down on top of an upward-facing keyboard.

In some cases, the sliding input device can be moved between a locked position and an unlocked position relative to the case. In this way, the input device can be prevented from moving (e.g., falling off of or sliding out of the bounds of the length and width dimensions of the closed-configuration case) while it is not being used. Attachment of the electronic device to the input device can cause the input device to unlock relative to the case and to thereby be able to slide and translate.

The input device can be made to slide or translate on top of a bottom panel of the folio or case cover while the bottom panel rests on a support surface, or the cover panel can slide beneath the input device while the input device is supporting the assembly on a support surface. The input device can be permanently attached to a back panel of the case, or, in some cases, the input device can be removable from the case panel. For example, the input device can be magnetically held to the case panel and can be non-destructively, reversibly separated from the case panel (while being reattachable thereto without modification of the input device or electronic device or addition of an attaching agent such as an adhesive) to reposition the input device relative to the case panel.

Additionally, portions of the case can be attached to each other at hinges. A back panel or back portion can comprise two sub-panels that are joined by a hinge or other connection point. In some cases, the hinge can be designed to have an adjustable connection point between the sub-panels. The back portion of the case can be attached to a bottom portion of the case via a hinge that is a living hinge, and expendable or stretchable hinge, a multi-pivot hinge, or the like.

In aspects of this disclosure, the input device can have a wide variety of different types of input reception or output provision, such as, for example, a keyboard, a trackpad, a keyboard plus a trackpad, a supplemental display for the electronic device, or an input device having a dynamic function row or other touchscreen interface. The input device can provide an additional functionality such as storing a trackpad or other small input device inside the input device, providing inductive charging to other accessories, or providing other supplemental features.

As used herein, an electronic device is "pivotally mounted" to the input device when the electronic device is pivotable about a pivot axis while in contact with the input device, and the electronic device moves with the input device while the input device translates parallel to a horizontal plane containing the pivot axis.

As used herein, the stability of a device or assembly increases (i.e., it becomes more stable) when its center of gravity moves toward its center of width and length dimensions or its center of gravity moves downward. A device or assembly can be considered "stable" in a certain position when, under normal use conditions, a horizontal force applied to a top end of the device tends to make the device slide horizontally on an unobstructed, horizontal support surface rather than rotating (i.e., tipping over). Additionally, modifying the device in some way to increase the amount of force necessary to tip over the device on the horizontal support surface can be referred to as increasing the stability of the device.

These and other embodiments are discussed below with reference to the figures. However, those skilled in the art will readily appreciate that the detailed description given herein with respect to these figures is for explanatory purposes only and should not be construed as limiting.

Figure 1:
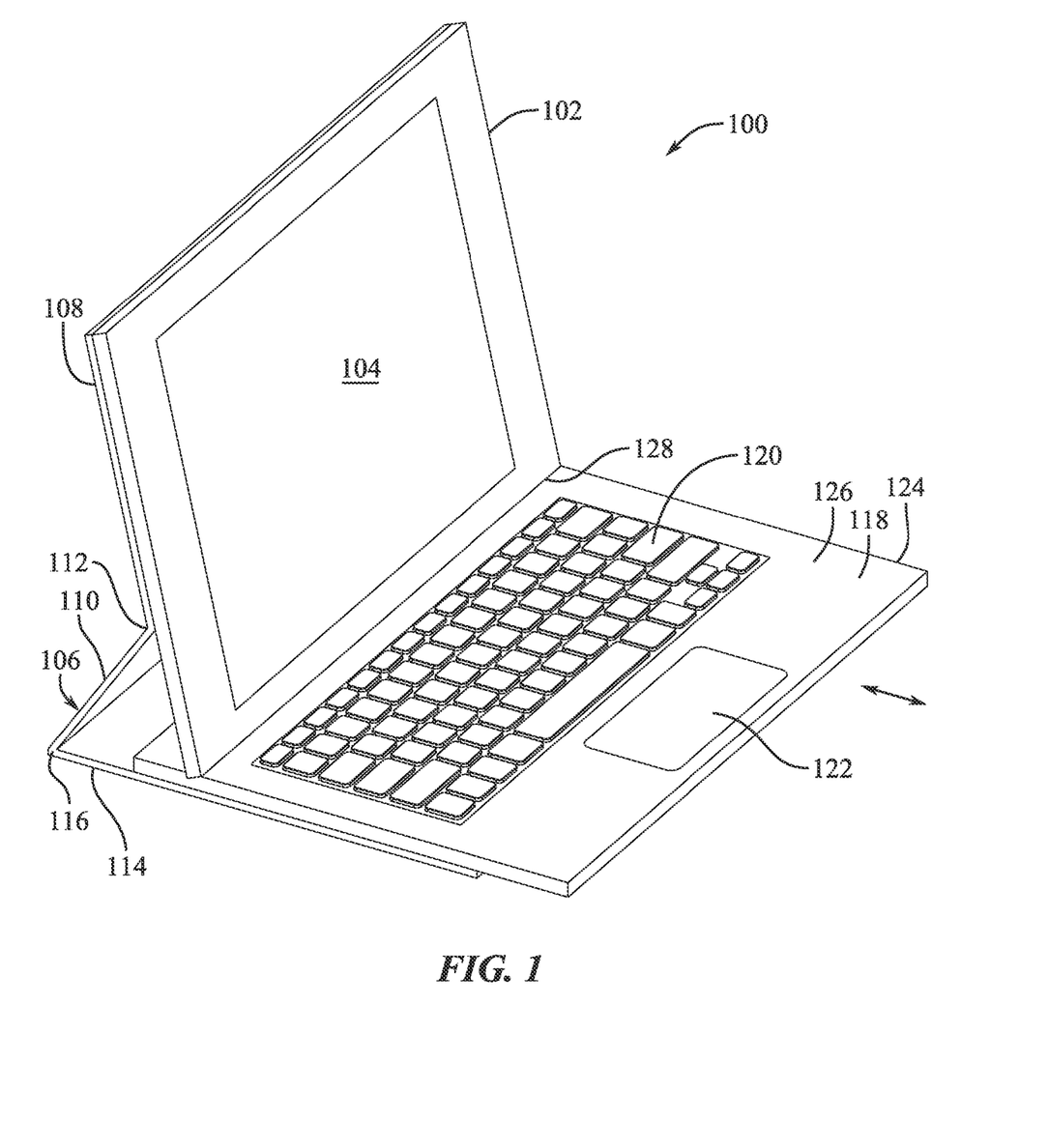
FIG. 1 shows a perspective view of a computing system.

FIG. 1 illustrates a perspective view of a computing system 100 according to the present disclosure. The computing system 100 can comprise an electronic device 102 having a display 104. The electronic device 102 can be positioned in a case 106 having a first back portion 108 (i.e., a mountable portion), a second back portion 110 (i.e., a rotatable portion) joined to the first back portion 108 by an upper hinge 112, and a bottom portion 114 connected to the second back portion 110 by a lower hinge 116. An input device 118 comprising a keyboard 120 and trackpad 122 or other input surface can be movably mounted to the bottom portion 114, such as by being slidable or translatable along an axis of translation relative to the bottom portion 114. For example, the input device 118 can move along the direction shown by the arrow in FIG. 1. In other words, the input device 118 can translate along a direction toward or away from the lower hinge 116. In some embodiments, the input device 118 is simultaneously attached to the bottom portion 114 in a manner preventing vertical movement of the input device 118 relative to the bottom portion 114 (i.e., movement in a direction at least partially normal to the inner surface of the bottom portion 114).

The electronic device 102 can comprise a tablet computer, a smart phone, a display, similar devices, or combinations thereof that can be used with an input device 118. Accordingly, the electronic device 102 can include a processor, internal memory, input and output devices, such as a touch screen display, buttons, speakers, haptic feedback generators, related devices, and combinations thereof. Electronic device 102 can beneficially have a substantially planar front surface within which (or on which) the display 104 is positioned. Electronic device 102 can also have a back surface or rear surface that can be generally planar and configured to engage the first back portion 108 of the case 106. The electronic device 102 can comprise attachment features that help the electronic device 102 stay in engagement with the case 106, such as internal magnets that attract magnets associated with the case 106, fasteners, adhesives, related devices, or combinations thereof. In some embodiments, the first back portion 108 is integrally connected to the rear surface of the electronic device 102, and the case 106 and electronic device 102 are therefore made as a single unit. In this case, the second back portion 110 can still be pivotable relative to the electronic device 102 at an upper hinge 112.

The case 106 can comprise panels in the portions 108, 110, 114 that are substantially planar and substantially rigid compared to the hinges 112, 116. Accordingly, those panels can provide support to the electronic device 102 and input device 118 when the case 106 is positioned on a support surface below bottom portion 114. See, e.g., horizontal support surface 200 in FIG. 2. The case 106 can comprise a variety of materials, such as leather, a flexible polymer, rubber, an elastomeric material, or other compliant, soft, and bendable materials across its outer surfaces or forming the hinges 112, 116. Accordingly, the hinges 112, 116 can be referred to as "living" hinges, wherein the hinges 112, 116 are made with a flexible elastic material rather than comprising pivoting, rotating hinges (e.g., a door hinge or pin-in-barrel hinge). In some embodiments, the hinges 112, 116 can comprise pivoting hinges instead of, or in addition to, living hinges.

The major width and length dimensions of the bottom portion 114 can be substantially equal to the major width and length dimensions of the electronic device 102. In this manner, the overall size of the computing system 100 can be substantially equal to those major width and length dimensions when the computing system 100 is in a fully stowed configuration. See FIG. 6. As used herein, the major width and length dimensions are the largest width and length dimensions of the electronic device 102 and bottom portion 114 and are not the minor thickness dimensions typical to these types of devices. In the electronic device 102, for example, the major width and length dimensions are measured across the viewing plane through which the display 104 is visible.

The input device 118 can include one or more interfaces for receiving input or output from a user. In some embodiments, the input device 118 can be referred to as an interface device or an electronic interface. The keyboard 120 can comprise a set of key switches and key caps used to provide alphanumeric input and other input tasks for the electronic device 102. The track pad 122 can include a touch-sensitive surface for detecting capacitive or resistive touches such as from a user instrument, e.g., a finger.

The input device 118 can have a housing 124 around the keyboard 120 and the trackpad 122. The housing 124 can have a top surface 126 configured to engage a bottom surface or bottom edge 128 of electronic device 102. The bottom edge 128 can reside in a groove or depression in the top surface 126. See FIGS. 7 and 10.

In some embodiments, the input device 118 can have an electronic connection to the electronic device 102 through a set of conductive pads or other electrical conductors that contact the electronic device 102. In some cases, the input device 118 can have a wireless connection to the electronic device in addition to, or in place of, a physical or "wired" electronic connection. Such a wireless connection can may be via a wireless communication protocol, e.g., WI-FI®, BLUETOOTH®, similar wireless interfaces, and combinations thereof. Additionally, the input device 118 can have an electrical connection to the electronic device 102 via electrical conductors that pass through the case 106 to the electronic device 102. For example, the electronic device 102 can have conductive pads on the rear surface of its housing that contact exposed electrical connectors on an inner surface of the first back portion 108 of the case.

Figure 4:
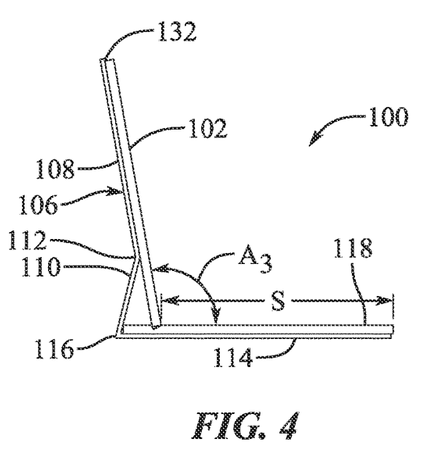
FIG. 4 shows a side view of the computing system in a third configuration.
Figure 5:
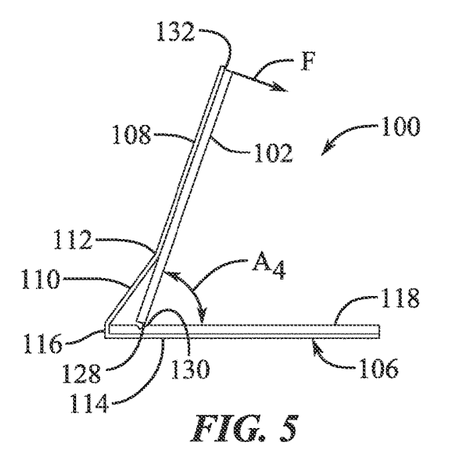
FIG. 5 shows a side view of the computing system in a fourth configuration.
Figure 6:
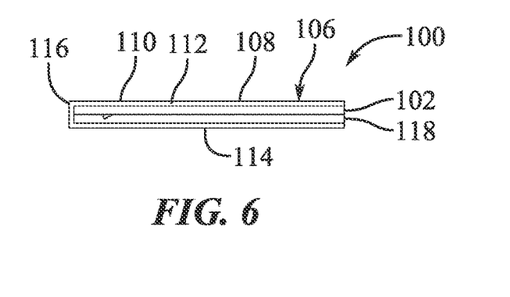
FIG. 6 shows a side view of the computing system in a fifth configuration.

FIGS. 2-6 illustrate side views of the computing system 100 in various configurations and relative component positions. FIGS. 2-5 show the computing system 100 in various open configurations wherein the primary user interface portions of the electronic device 102 and the input device 118 are accessible, viewable, and usable by a user. FIG. 6 shows a closed configuration wherein the electronic device 102 and the input device 118 are covered by the case 106, and their primary input or output surfaces are not accessible or viewable.

Figure 2:
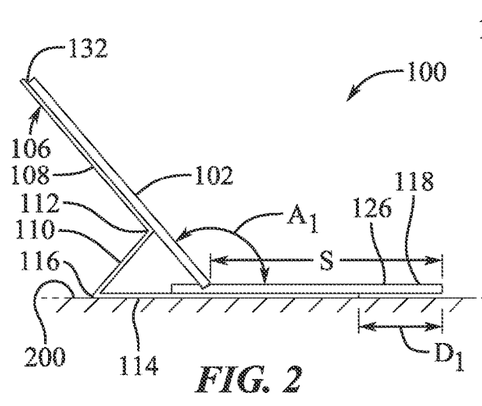
FIG. 2 shows a side view of the computing system in a first configuration.

In FIG. 2, the viewing angle $A_1$ defined between the primary surface of the electronic device 102 (i.e., the viewer-facing surface or the display surface) and the top or upward-facing surface of the input device 118 has a relatively high magnitude. In some embodiments, the angle $A_1$ can have a magnitude of about 135 degrees or more. The distance S indicates the amount of usable area of the input device 118. Accordingly, even at a high viewing angle, all of the interactive areas of the input device 118 remain accessible and usable by the user.

Figure 3:
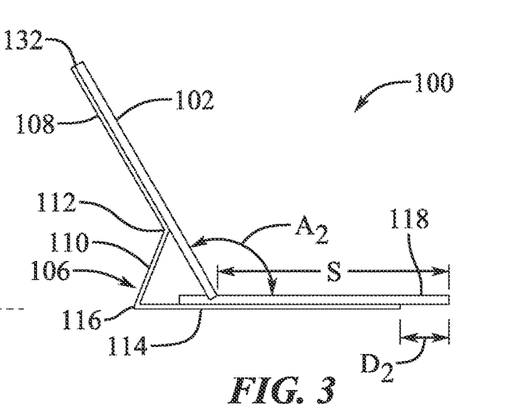
FIG. 3 shows a side view of the computing system in a second configuration.

In FIG. 3, the viewing angle $A_2$ is smaller than angle $A_1$ due to the input device 118 laterally translating relative to the bottom portion 114 and hinge 116. This lateral translation is also accompanied by rotation of the electronic device 102 about a pivot axis positioned approximately where the electronic device 102 touches the input device 118. Additionally, an overhang distance $D_2$ in FIG. 3, as measured between the forward-most edge of the input device 118 and the forward-most edge of the bottom portion 114, is smaller than the overhang distance $D_1$ in FIG. 2. The overhang distances also represent the amount of the input device 118 that overhangs a support surface below the bottom portion 114 or is otherwise not positioned over the bottom portion 114. The angles between the portions 108, 110, 114 at the upper and lower hinges 112 and 116 are also greater in magnitude in the orientation of FIG. 3 as compared to FIG. 2. Accordingly, repositioning electronic device 102 in the input device 118 to a smaller viewing angle, such as transitioning from angle $A_1$ to angle $A_2$, can increase the angles at the hinges 112 and 116 while decreasing the overhang distance $D_2$. In FIG. 3, the amount of usable area of the input device 118 is equal to the distance S shown in FIG. 2. Accordingly, changing the viewing angle of the electronic device 102 may not change the amount of the usable input area of the input device 118. In other words, the usable interactive area of the input device 118 can remain consistent across a spectrum of viewing angles of the electronic device 102.

In FIG. 4, the input device 118 translates to a position that is fully retracted, and the input device 118 can be entirely positioned over the bottom portion 114 (or at least with minimal or negligible overhang). The electronic device 102 is at an even more vertical viewing angle, as shown by angle $A_3$. In one embodiment, the angle $A_3$ can be approximately 120 degrees. Additionally, when in the position shown in FIG. 4, there is no significant overhang distance (and in some embodiments, no overhang distance at all). The distance S across the accessible and usable portion of the interactive surface of the input device 118, however, is unchanged. Accordingly, the amount of usable area across distance S remains constant for any viewing angle of the electronic device 102 compared to the input device 118, at least while the electronic device 102 has its bottom edge 128 on top of the input device 118 in an open configuration.

FIG. 5 shows a position wherein the electronic device 102 is closing relative to the input device 118, as shown by the angle $A_4$ being smaller in magnitude than the angle $A_3$. FIG. 6 shows a completely closed configuration wherein the front surface of the electronic device 102 is oriented face-to-face with the top surface of the input device 118, and the portions 108, 110, 114 of the case 106 protect and sandwich the electronic device 102 and input device 118. Upon reaching angle $A_4$, the electronic device 102 can detach the bottom edge 128 from the input device 118 as the back surface of the electronic device 102 moves into contact with the second back portion 110 and the hinge 112 flattens. Electronic device 102 can be configured to automatically detach bottom edge 128 as a rotating closing force F is applied, for example, to the opposite end of the electronic device 102. The front outer surface of the electronic device 102 can then close the distance to sit face-to-face with input device 118.

When the computing system 100 is opened from the position shown in FIG. 6 to the position of FIG. 5, the user can pull the electronic device 102 from the input device 118, thereby pivoting lower hinge 116, then pivoting the first back portion 108 relative to the second back portion 110 about upper hinge 112 to move the bottom edge 128 of the electronic device 102 into a recess or groove in the input device 118. In some embodiments, a recess or groove in the input device 118 can be omitted, and the bottom edge 128 can be held against input device 118 using a different mechanism, such as a magnetic latch that attracts the bottom edge 128 to a retention line 130 on the top of the input device 118.

With the bottom edge 128 held at the retention line 130, the bottom edge 128 (or an axis through the retention line 130) can be the pivoting axis for the electronic device 102 relative to the input device 118. Pivoting the electronic device 102 about that pivoting axis can induce the sliding translation movement of the input device 118 relative to the bottom portion 114, as illustrated in FIGS. 2-4. During this rotating movement, the distance S can remain constant, and the entire keyboard 120, track pad 122, and any other interfaces of the input device 118 can remain uncovered and usable without moving underneath the electronic device 102.

Furthermore, simultaneous movement of the electronic device 102 and input device 118 can be produced, for example, by manipulating electronic device 102 and case 106 at the top end 132. In this manner, a user can, with a single-handed operation at the top end 132, move between open and closed configurations of the computing system 100. When the computing system 100 is closed by the user, application of the force F can help release the bottom edge 128 from the position of the retention line 130 so that the case 106 can swivel down (about hinges 112 and 116) to the position shown in FIG. 6. A counteracting force (e.g., a force applied by the user to hold down the input device 118) is not required to be applied to the input device 118 or bottom portion 114 to open or close the computing system 100.

Figure 7:
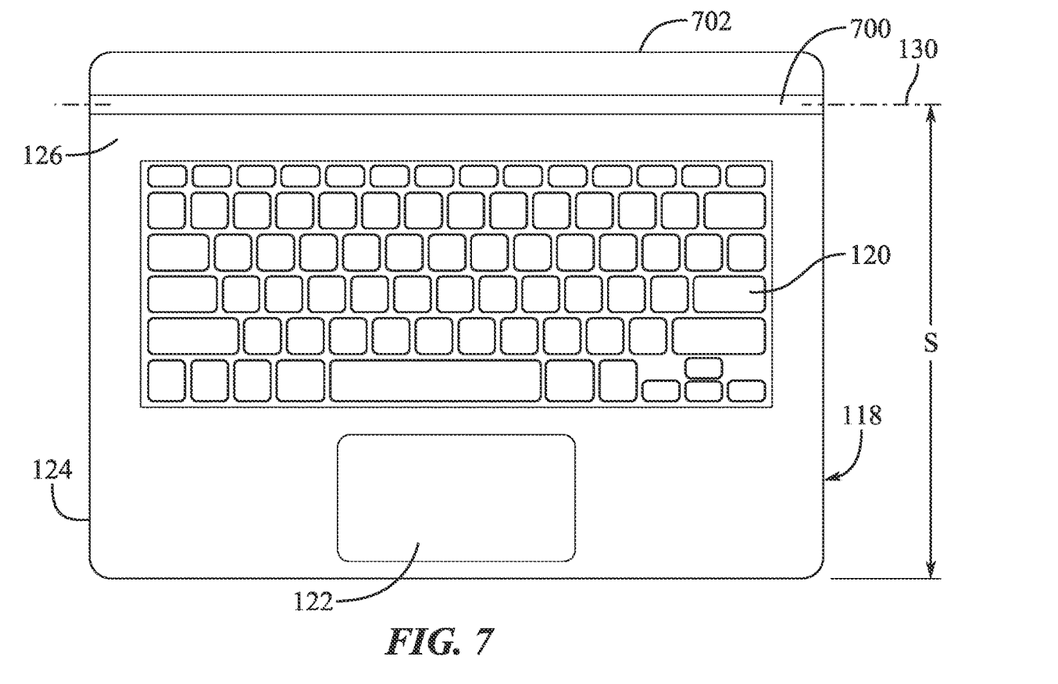
FIG. 7 shows a top view of an input device.

FIG. 7 shows a top view of the input device 118. A recess, trough, or groove 700 is positioned between a rearward edge 702 and the keyboard 120 on the housing 124 and in the top surface 126. The length of recess or groove 700 can be equivalent to the length of the electronic device 102 that contacts the input device 118. The groove 700 can extend along the retention line 130 and can be the connection location for the electronic device 102 against the input device 118 at the top surface 126. The length S can extend from the groove 700 to a front edge of the input device 118, as shown in FIG. 7. The length S can include sufficient space for a standard-sized keyboard 120 and a trackpad 122.

Figure 8:
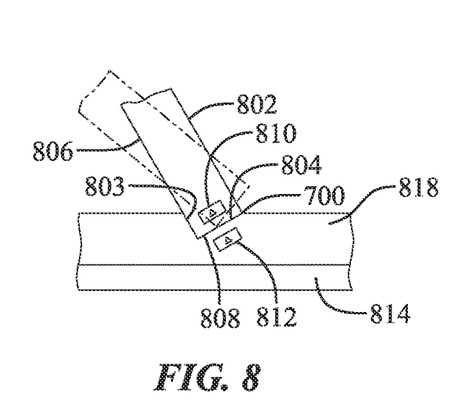
FIG. 8 shows a diagrammatic side section view of an electronic device mated to an input device and a bottom portion of a case.
Figure 9:
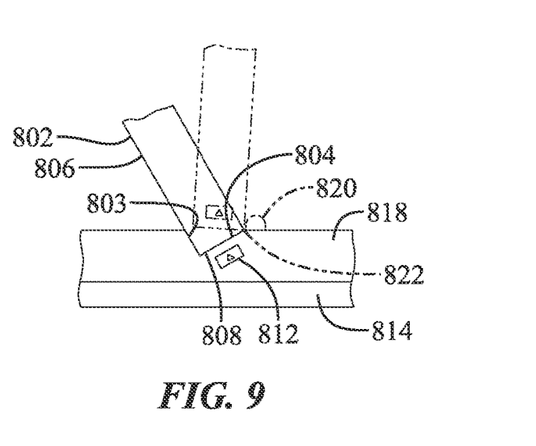
FIG. 9 shows another diagrammatic side section view of an electronic device mated to an input device and a bottom portion of a case.

FIGS. 8 and 9 show side section views of an embodiment of the electronic device 802 (which can be, for example, electronic device 102) positioned in the groove 700. The input device 818 and bottom portion 814 are shown below the electronic device 802. The groove 700 can comprise a rear surface 803 and a bottom surface 804 configured to respectively engage a rear surface 806 and a bottom surface 808 of the electronic device 802.

Magnetic elements 810, 812 in the electronic device 802 and in the input device 818, respectively, can be attracted to each other in a manner that helps to keep the electronic device 802 within the groove 700 while the electronic device 802 is in an open position relative to the input device 818. The magnetic elements 810, 812 can apply a sufficient attractive force to each other to keep the electronic device 802 seated in the groove 700 at relatively high viewing angles, such as when the electronic device 802 is positioned at the angle shown in broken lines in FIG. 8 and the magnetic elements 810, 812 are spaced further apart than in the position shown in solid lines. Accordingly, the magnetic elements 810, 812 can keep the electronic device 802 at least partially held in the groove 700 (i.e., the electronic device 802 is at least partially within the recess of the groove 700 and below the adjacent top surface of the input device 818) even when the electronic device 802 is not in full contact with the surfaces 803, 804 of the groove 700. The magnetic elements 810, 812 can each comprise a permanent magnet, an electromagnet, a ferrous or other magnetically-attracted material, or combinations thereof, provided that at least one of the magnetic elements 810, 812 includes a magnetic field generating element configured to attract the other magnetic element.

The magnetic attraction between the electronic device 802 and the input device 818 can ensure that a force (e.g., force F) applied to the top end (e.g., 132) of the electronic device 802 can transfer the force and slide the input device 818 relative to the bottom portion 814 of the case as the electronic device 802 rotates at the retention line (e.g., 130) or groove 700. At sufficiently high (or low) viewing angles, the electronic device 802 can rotate out of the groove 700 enough to sufficiently weaken the attraction between the magnetic elements 810, 812 and thereby allow the electronic device 802 to detach from the input device 818. Alternatively, a user pulling vertically upward on the electronic device 802 or downward on the input device 818 can overcome the magnetic attraction to the input device 818 in a manner that allows disconnection of the electronic device 802 from the input device 818.

Furthermore, as shown in FIG. 9, a sufficient reduction in the viewing angle (as indicated in broken lines) can weaken the force of attraction between the magnetic elements 810, 812 in a manner that allows the electronic device 802 to be removed from the groove 700. In some cases, a forward stop 820 (e.g., the side of a ridge) can be positioned on the top surface of the input device 818 or on a front side of the groove 700 in order to help facilitate removal of the electronic device 802 from the groove 700, as shown in broken lines in FIG. 9. When a front bottom edge 822 of the electronic device 802 contacts the forward stop 820, the forward stop 820 can ensure that the electronic device 802 begins to rotate out of the groove 700 rather than sliding or translating the front bottom edge 822 forward across the top of the input device 818. The rotation of the device 802 can assist the user in overcoming the magnetic attraction between the magnetic elements 810, 812.

In some embodiments, a mechanism can be provided to remove the electronic device 802 from the groove 700. For example, forward rotation of the electronic device 802 relative to the input device 818 can cause a protrusion within the input device 818 or electronic device 802 to protrude in the groove 700 and to thereby drive the electronic device 802 out of the groove 700. In this manner, the mechanism can automatically assist the user in moving the electronic device 802 from a position similar to FIG. 4 to a position similar to FIG. 5 or from a position similar to the solid-line position of the electronic device 802 in FIG. 9 to the broken-line position shown in FIG. 9. In other words, movement of the protrusion can apply a force to the electronic device 802 to overcome the attractive force of the magnetic elements in the electronic device 802 and the input device 818.

In some embodiments, the input device 818 can have a rotatable structure at the position of the retention line 130, and the rotatable structure can be configured to engage and retain the electronic device 802 while being capable of simultaneously rotating with the input device 818. For example, the rotatable structure can cup the bottom of the electronic device 802 in a groove similar to groove 700 and can pivot with the bottom of the electronic device 802 relative to the input device 818. In this way, the rotatable structure can provide a consistent amount of support for (e.g., can provide consistent magnetic attraction force to) the electronic device 802 within a wide range of viewing angles.

Figure 10:
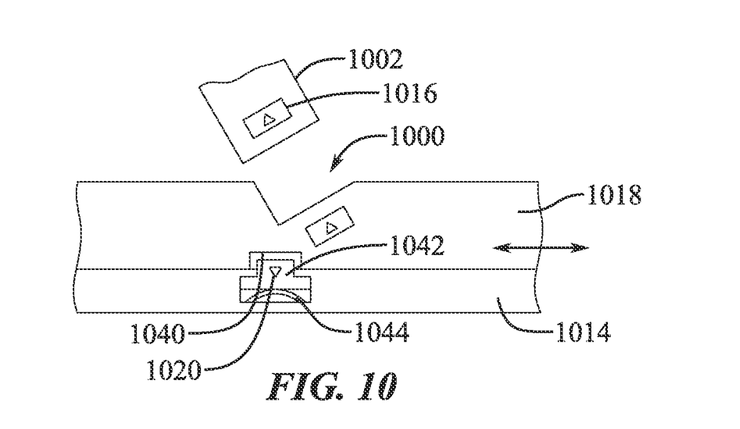
FIG. 10 shows another diagrammatic side section view of an electronic device, and input device, and a bottom portion of a case.

In some cases, the input device and the bottom portion can be releasably, positionally lockable to each other. When in a locked configuration, the input device can be prevented from translating relative to the bottom portion, and in an unlocked configuration, the input device can be slidable relative to the bottom portion as usual. FIG. 10 shows a side view of another embodiment wherein the input device 1018 comprises a receptacle 1040, and the bottom portion 1014 comprises a movable protrusion 1042. The protrusion 1042 can extend into the receptacle 1040 and can thereby mechanically prevent movement of the input device 1018 along a horizontal direction (e.g., as shown by the double-sided arrow in FIG. 10) by physical interference between the protrusion 1042 and the receptacle 1040. This locked configuration can prevent the input device 1018 from sliding out of the case while the computing system (e.g., 100) is in a stowed or closed position (e.g., as shown in FIG. 6) or while the electronic device 1002 is detached from the input device 1018 (e.g., as shown in FIGS. 5 and 10).

When the input device 1018 is seated in the groove 1000, the protrusion 1042 can be moved downward and out of the receptacle 1040. In some embodiments, magnetic elements 1016, 1020 in the electronic device 1002 and the protrusion 1042, respectively, can repel each other and thereby apply a downward-directed force to the protrusion 1042 that causes it to translate out of the receptacle 1040. Once this occurs, the input device 1018 can be in an unlocked configuration, and it can slide laterally across the top surface of the bottom portion 1014 of the case. The protrusion 1042 can be biased upward by a biasing member 1044 (e.g., an elastic dome or spring). Therefore, placing the electronic device 1002 against the groove 1000 can overcome the biasing force of the biasing member 1044 to move the protrusion 1042. Movement of the input device 1018 from a deployed position relative to the bottom portion 1014 (e.g., the position of FIG. 3) to a retracted position (e.g., the position of FIG. 4) can realign the protrusion 1042 and the receptacle 1040, and removal of the electronic device 1002 from the groove 1000 can allow the protrusion 1042 to return into the receptacle 1040, thereby locking the input device 1018.

Although magnetic elements 1016, 1020 are shown in FIG. 10, the protrusion 1042 can be moved using other mechanics or physical forces. For example, inserting the electronic device 1002 into the groove 1000 can cause a linkage or sliding member to move the protrusion 1042 out of the receptacle 1040. Additionally, although the protrusion 1042 and receptacle 1040 are shown respectively on the input device 1018 and the bottom portion 1014 near the groove 1000, their positions can be reversed or relocated on either device. If their positions are reversed, the protrusion 1042 can be attracted to the electronic device 1002 (or otherwise moved upward) in order to unlock the input device 1018 from the bottom portion 1014.

In some embodiments, the input device 1018 can be spring-loaded, wherein positioning the electronic device 1002 on the retention line (or in the groove 1000) unlocks the input device 1018 relative to the bottom portion 1014 and a biasing device causes the input device 1018 to automatically slide from a retracted, locked position (e.g., as shown in FIG. 4) to an extended, unlocked position (e.g., as shown in FIG. 3). Accordingly, the input device 1018 can automatically be unlocked and simultaneously translate away from the hinge of the case when the electronic device 1002 is mounted to the input device 1018. This can help the user bring the electronic device 1002 and input device 1018 into a normal viewing or using position more quickly when opening the computing system and can encourage use of the assembly in the unlocked, deployed configuration.

Figure 11:
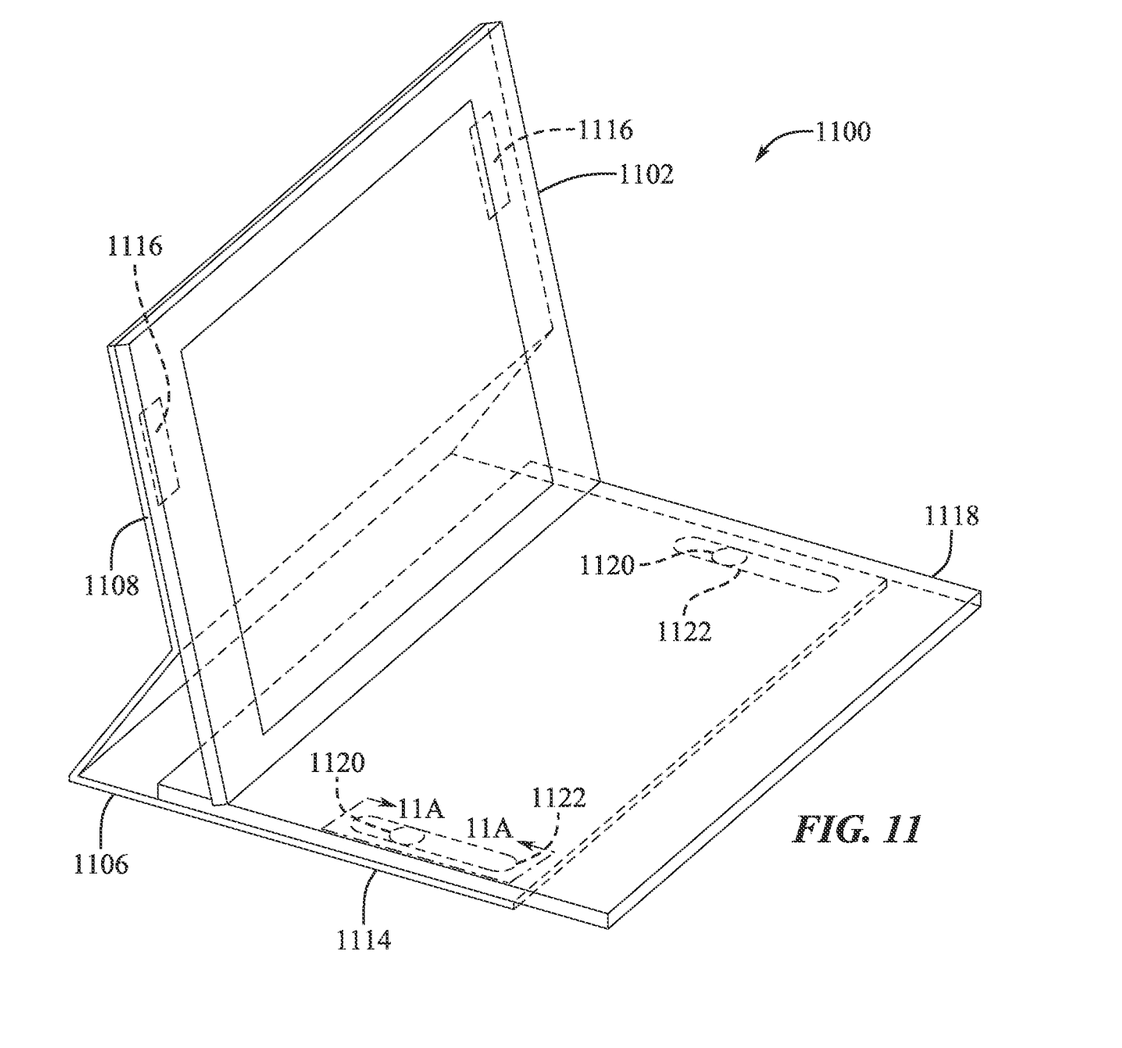
FIG. 11 shows a perspective view of components of a computing system.

FIG. 11 shows a perspective view of other elements of the computing system 1100. In this view, the electronic device 1102 is mounted to the input device 1118 and case 1106. The electronic device 1102 is mounted by magnetic elements 1116 associated with the first back portion 1108 and in the electronic device 1102. The first back portion 1108 is therefore held against the electronic device 1102 by a magnetic attraction force between the parts.

A pin-and-slot configuration can guide the movement of the input device 1118 relative to the bottom portion 1114 of the case 1106. The pins 1120 can be part of the input device 1118, and the slots 1122 can be part of the bottom portion 1114, or vice versa. The pins 1120 can be substantially stationary relative to the input device 1118, and the slots 1122 can be stationary relative to the bottom portion 1114. Thus, movement of the input device 1118 relative to the bottom portion 1114 can cause the pins 1120 to traverse the slots 1122 within the limits of the ends of the slots 1122. Furthermore, the pins 1120 and slots 1122 can guide the movement of the input device 1118 so that it is constrained to movement along an axis of motion relative to the bottom portion 1114 (i.e., instead of a within a plane of motion or within a three dimensional range of positions relative to the bottom portion 1114). The input device 1118 can be infinitely adjustable relative to the bottom portion 1114 within the range defined by pin movement within the slots. In other words, the input device 1118 can be moved within a range of positions, and the movement within that range can include an infinite number of minute, discrete adjusted positions in which the electronic device 1102 is stably supported. The input device 1118 is therefore not limited to being used in a limited number of different stable positions for the electronic device 1102.

Figures 11A, 12:
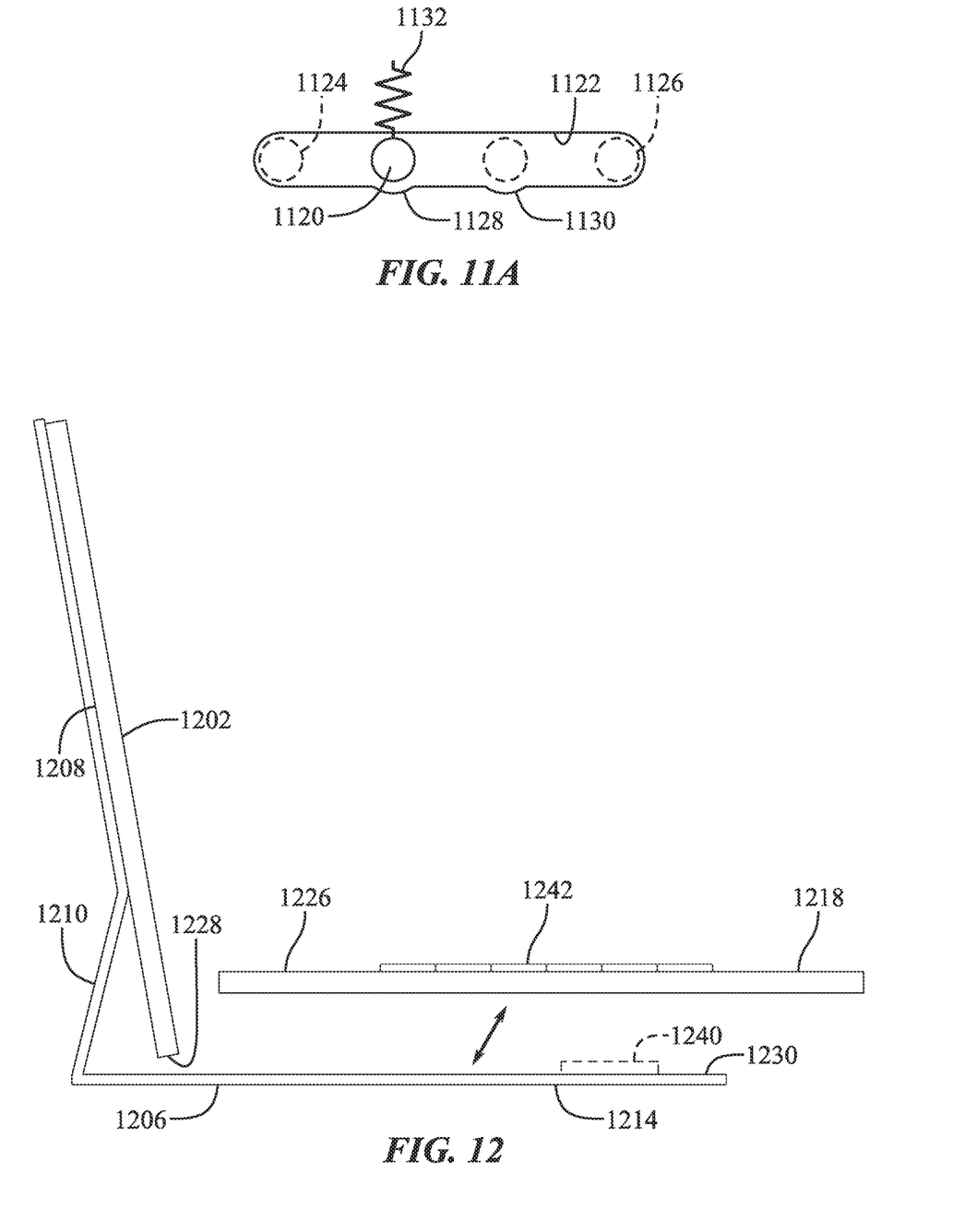
FIG. 11A shows a diagrammatic top view of a pin-and-slot feature of the computing system of FIG. 11.
FIG. 12 shows a side view of another computing system having a removable input device.

FIG. 11A shows a diagrammatic top view of a pin 1120 in a slot 1122. The pin 1120 can be movable along the slot 1122 to extreme end positions 1124, 1126 wherein the pin 1120 contacts the ends of the slot 1122 and therefore limits movement of the input device 1118 relative to the bottom portion 1114 of the case 1106. In some embodiments, the slot 1122 can comprise one or more detents 1128, 1130, and the pin 1120 can be biased by a biasing member 1132 in a direction toward the side of the slot 1122 having the detents 1128, 1130. In this manner, the pin 1120 can be biased into positions seated in a detent 1128/1130, and the user must provide an increased input force to the electronic device 1102 (e.g., force F) or to the input device 1118 in order to slide the input device 1118 as compared to positions in which the pin 1120 is not in a detent 1130. In other words, the user can be required to overcome the biasing force to move the pin 1120 from the detent 1128/1130. With this feature, the input device 1118 can be soft-lockable into preferred viewing positions for the electronic device 1102 that correspond to typical viewing angles. For example, the detents 1128, 1130 can correspond with typically preferred viewing positions of FIGS. 2 and 3. Use of the detents 1128, 1130 can limit unwanted or inadvertent viewing angle adjustment of the electronic device 1102 while the pin 1120 is seated therein.

Although a pin and slot interface is shown in FIG. 11, other types of motion-limiting structures can be used to control lateral translation of the input device 1118 relative to the bottom portion 1114, such as gears, limited-length springs, ridge-in-groove features, similar structures, and combinations thereof. Therefore, many types of lateral motion constraints can be used to guide movement of the input device 1118 relative to the bottom portion 1114. Furthermore, features of the input device 1118 and bottom portion 1114 can prevent separation of the input device 1118 from the bottom portion 1114 in a vertical direction (e.g., in a direction parallel to a normal direction extending from the top surface of the input device 1118).

FIG. 12 shows another configuration wherein the input device 1218 is removable from the bottom portion 1214 of the case 1206. In this example, the input device 1218 can be releasably mountable to the bottom portion 1214 by connectors such as magnetic elements in the case 1206, device 1218 or mechanically interlockable parts. The bottom end 1228 of the electronic device 1202 can be configured to contact the inner surface 1230 of the bottom portion 1214 when the input device 1218 is removed.

Removal of the input device 1218 can allow the user to reposition the input device 1218 to any preferred position relative to the electronic device 1202. Additionally, features on the bottom portion 1214 such as an external track pad 1240, display, or other interface device can be exposed and usable upon removal of the input device 1218 from the bottom portion 1214. In some embodiments, the input device 1218 can have an interface element 1242 such as a keyboard that is accessible and usable upon attachment of the input device 1218 with its top surface 1226 facing upward, and the interface element 1242 can be moved into a covered, stowed, and protected position by turning over the input device 1218 so that the top surface 1226 faces the surface 1230 of the bottom portion 1214. In that position, the case 1206 and input device 1218 can be mounted to each other so that the interface element 1242 is hidden or blocked from user interaction. In this manner, the interface element 1242 can be protected from receiving inadvertent or unwanted input or providing unneeded output. For example, the bottom portion 1214 can be rotated about the hinge to be positioned against the back portions 1208, 1210, and the input device 1218 can be stowed in a position that prevents the user from accidentally providing input via the interface element 1242 while it is behind the electronic device 1202. See also FIGS. 16A-16B. The input device 1218 can therefore be moved into a face-to-face orientation with the back portions 1208, 1210.

Figure 13:
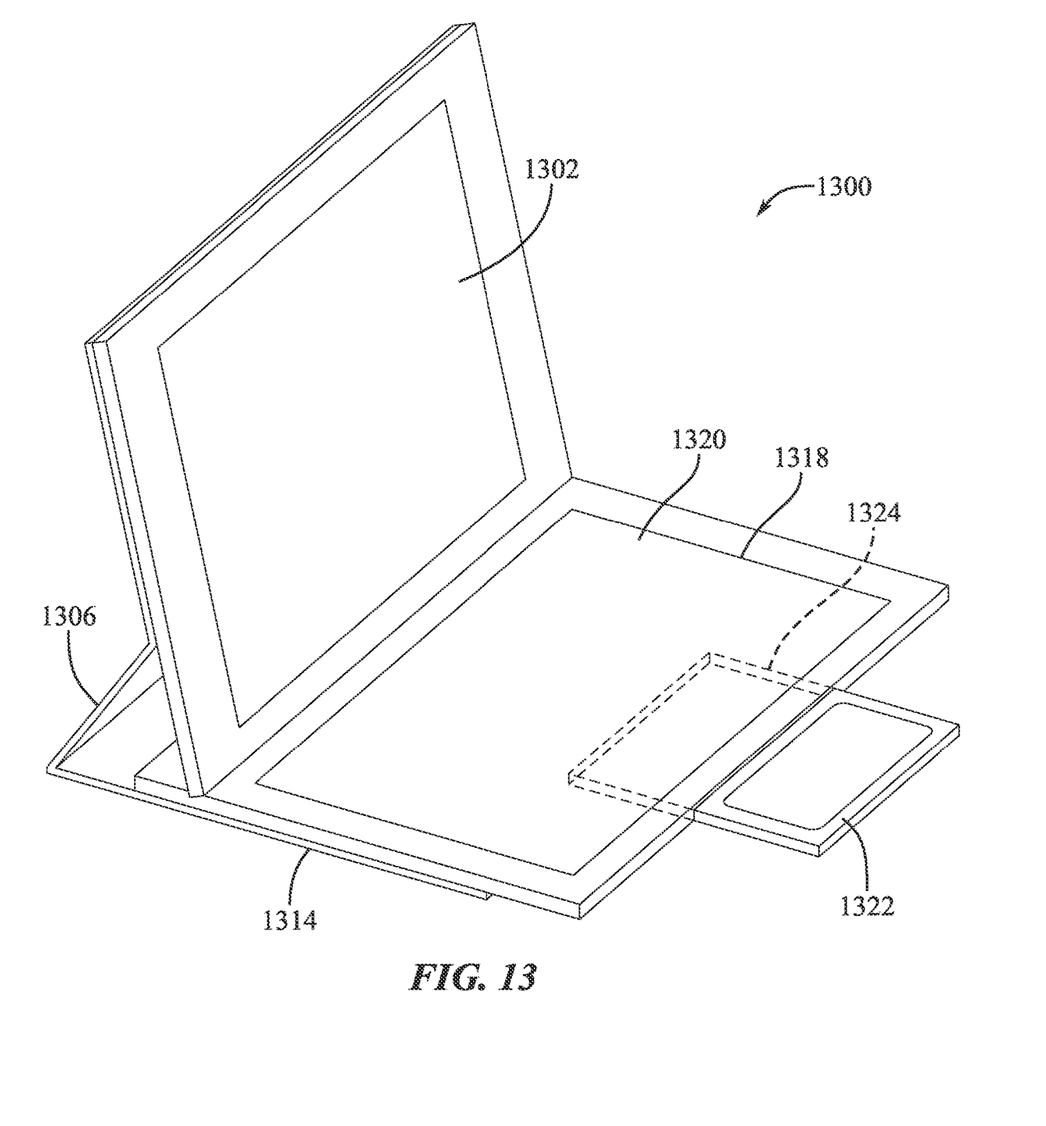
FIG. 13 shows a perspective view of another computing system.

FIG. 13 shows a perspective view of an additional embodiment of the computing system 1300. The input device 1318 is shown with a generic interface area 1320 to illustrate that the input device 1318 can comprise a variety of user interface elements such as a keyboard, display, track pad (e.g., a track pad covering substantially all of the interface area 1320), etc. In some embodiments, the input device 1318 can further comprise an auxiliary input device 1322 that is translatable between a stowed position within a recess 1324 of the input device 1318 (or within a recess of the bottom portion 1314) and an active or usable position extending from the recess 1324 (as shown in FIG. 13). The auxiliary input device 1322 can comprise a track pad or other interface device described herein. The auxiliary input device 1322 can extend from a front or lateral side surface of the input device 1318.

Figure 14:
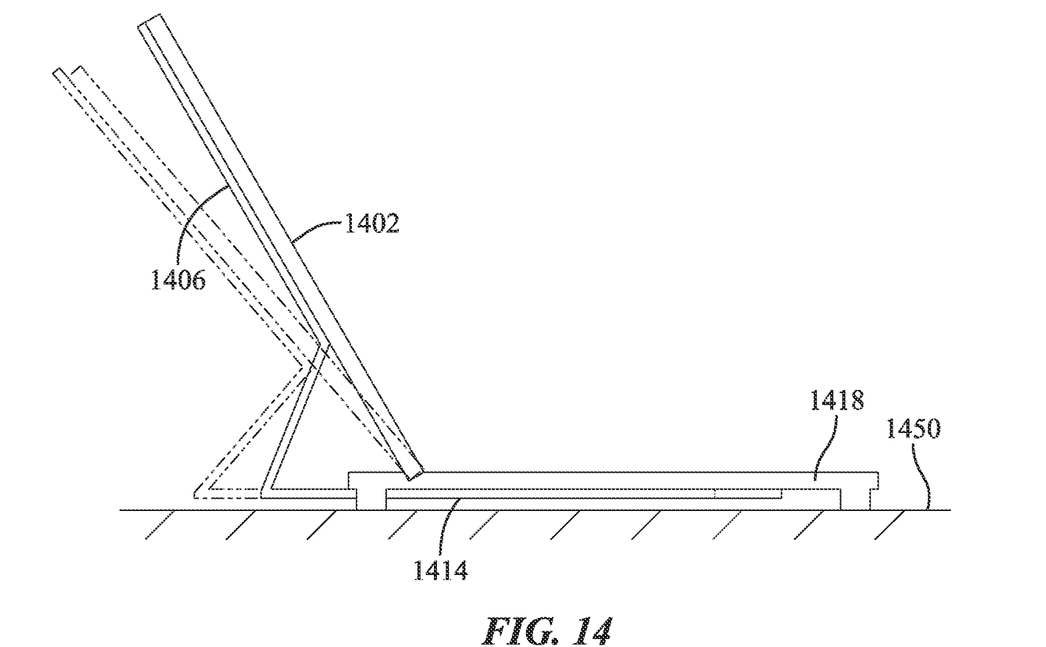
FIG. 14 shows a side view of another computing system.

FIG. 14 shows a side view of another embodiment wherein the electronic device 1402 is mounted to a case 1406 and to an input device 1418 that allows a different type of translation between the parts. Here, the input device 1418 remains stationary relative to a support surface 1450 while the bottom portion 1414 of the case 1406 is slidable between various positions. Accordingly, relative movement of the bottom portion 1414 and the input device 1418 can comprise movement of the input device 1418 or the case 1406 relative to support surface 1450. Movement of the case 1406 instead of the input device 1418 relative to the support surface 1450 can beneficially keep the input device 1418 still as the electronic device 1402 is rotated, similar to how a keyboard portion of a laptop computer is stationary as the display portion is rotated. Accordingly, the embodiment of FIG. 14 can provide a user experience that is more similar to a laptop computer user experience by minimizing sliding of the keyboard.

Figure 15:
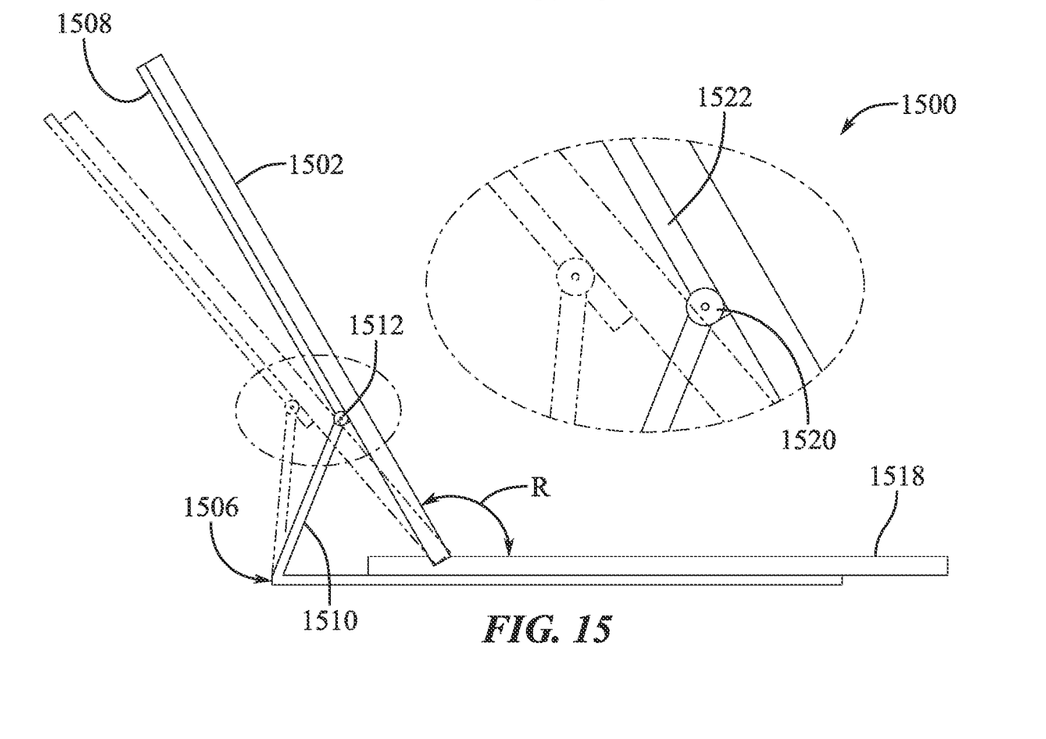
FIG. 15 shows a second configuration of the computing system of FIG. 14.

FIG. 15 is a side view of another embodiment of a computing system 1500 wherein the first hinge 1512 comprises a slidable, rollable, or otherwise movable connection between the first back portion 1508 and the second back portion 1510 of the case 1506. Accordingly, the viewing angle R of electronic device 1502 relative to the input device 1518 can increase by movement of the first hinge 1512 relative to the back portion 1508 even if the input device 1518 does not slide. In some embodiments, that hinge 1512 can include a wheel 1520 or other pin or roller that is movable longitudinally along the back portion 1508, such as within a track 1522 therein. The broken lines in FIG. 15 indicate an alternate tilted position of electronic device 1502 and back portion 1508. A properly designed amount of friction or preload in the wheel 1520 and track 1522 interface can limit the amount of unintentional or unwanted movement of the wheel 1520 relative to the track 1522.

In another example embodiment, the back portions 1508, 1510 can be slidable relative to each other. Thus, rather than a hinge 1512 having a wheel 1520 and track 1522, one of the back portions 1508, 1510 can be bendable and can have an end that bends to slide across or underneath the other back portion 1510, 1508. For example, an upper end of the back portion 1510 can slide between the other back portion 1508 and the electronic device 1502 as the viewing angle of the electronic device 1502 increases, and that upper end can slide out as the viewing angle decreases. A predetermined amount of friction between the sliding panel and the stationary panel or electronic device 1502 can limit the amount of unintended or unwanted movement of the panels relative to each other.

Figure 16A:
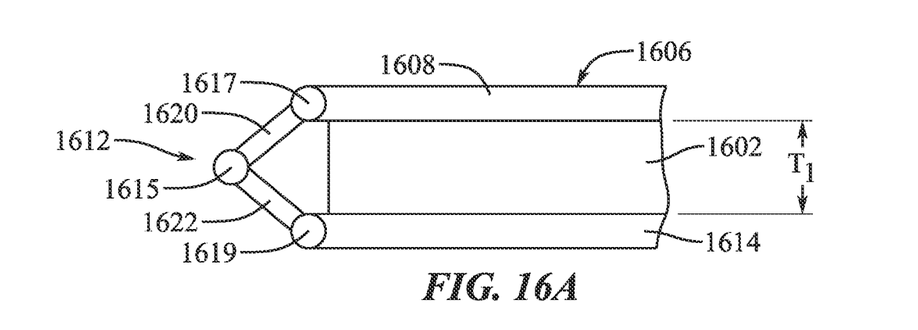
FIG. 16A shows a first configuration of a hinge of a computing system.
Figure 16B:
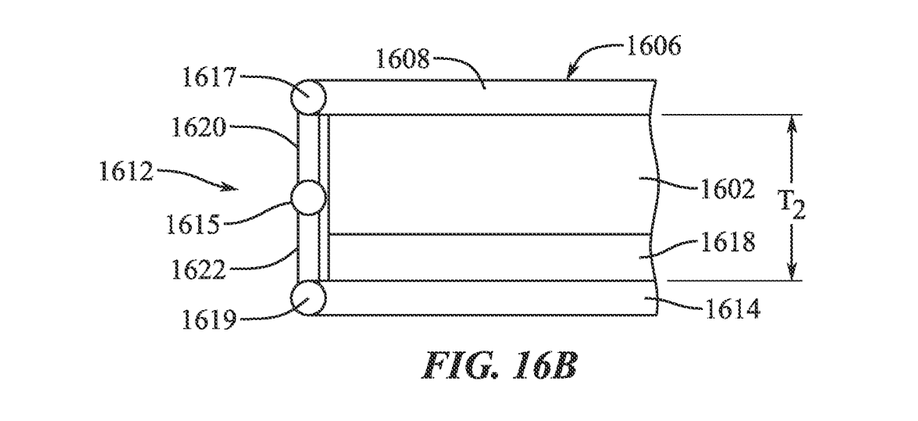
FIG. 16B shows a second configuration of the hinge of FIG. 16A.

FIGS. 16A and 16B illustrate side views of a case 1606 having an expandable and collapsible hinge 1612. The hinge 1612 can connect a back portion 1608 that is mounted to an electronic device 1602 to a bottom portion 1614. In some embodiments, the input device 1618 is removable from the bottom portion 1614, as discussed in connection with at least FIG. 12. Accordingly, the hinge 1612 can accommodate the difference in thickness T between the portions 1608, 1614 of the case 1606. As shown in FIG. 16A, the hinge 1612 can comprise three pivots 1615, 1617, and 1619 joining two rotatable panel members 1620 and 1622. When an input device is not included, the thickness $T_1$ is reduced as compared to thickness $T_2$, so the center pivot 1615 moves laterally outward and away from that electronic device 1602 in order for the bottom portion 1614 to contact the electronic device 1602. When the input device is included, the pivot 1615 expands and straightens to align the rotatable panel members 1620 and 1622, thereby accommodating the increased thickness $T_2$ within the case 1606.

Although a pivoting hinge embodiment is shown in FIGS. 16A and 16B, other types of hinges can be used to obtain the change in the thickness T of the gap between the back portion 1608 and bottom portion 1614 of the case 1606. For example, the hinge 1612 can instead comprise an elastic material configured to stretch and expand to accommodate the thickness $T_2$ and to relax and shrink to match thickness $T_1$. In that embodiment, the hinge 1612 may not necessarily move laterally outward away from the electronic device 1602 when in a reduced-thickness configuration (e.g., as shown in FIG. 16A). In another embodiment, the hinge 1612 can elastically bend to bulge outward and away from the electronic device 1602 when the thickness T is reduced.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A computing system, comprising:
an electronic device having a rear surface and a bottom-most surface or bottom-most edge; and
a case, the case including:
a first back portion mounted to and reversibly separable from the rear surface of the electronic device;
a second back portion coupled to the first back portion at an upper hinge;
a bottom portion coupled to the second back portion at a lower hinge, the lower hinge having an expandable thickness; and
an input device slidably mounted to the bottom portion and positionable to support the bottom-most surface or the bottom-most edge of the electronic device.

2. The computing system of claim 1, wherein the input device is slidable relative to the lower hinge.

3. The computing system of claim 1, wherein at least one of the upper and lower hinges comprises a living hinge.

4. The computing system of claim 1, wherein the input device comprises a top surface having a recess in which the bottom most surface of the electronic device is supportable.

5. The computing system of claim 1, wherein the first and second back portions are substantially planar.

6. The computing system of claim 1, further comprising a magnet positioned in the first back portion and configured to attract the electronic device to the first back portion.

7. The computing system of claim 1, further comprising a magnet positioned in the input device and configured to attract the electronic device to a supported position on the input device.

8. The computing system of claim 1, wherein the bottom portion and the input device are lockable to each other and unlockable from each other.

9. The computing system of claim 1, wherein the input device is biased to at least two positions relative to the bottom portion by a pin positionable into a detent.

10. A computing device case, comprising:
a first portion including a panel mountable to a back surface of an electronic device;
a second portion;
an adjustable connection between the first portion and the second portion, the adjustable connection being longitudinally adjustable along the panel;
a bottom portion rotatably connected to the second portion and having a top surface; and
an input device connectable to the electronic device and positioned on the top surface of the bottom portion, the input device being slidable relative to the top surface of the bottom portion.

11. The computing device case of claim 10, wherein the adjustable connection comprises a roller or pin movable along a track in the first portion.

12. The computing device case of claim 10, wherein the second portion comprises a second panel, wherein the second panel is substantially planar.

13. The computing device case of claim 10, wherein the first portion is reversibly removable from the electronic device.

14. The computing device case of claim 10, wherein the input device comprises a top retention surface to retain the electronic device relative to the input device.

15. The computing device case of claim 10, wherein the first portion and the second portion are slidable relative to each other at the adjustable connection.

16. A computer interface, comprising:
an electronic device; and
a case mounted to the electronic device and including:
a back portion;
a bottom portion pivotally connected to the back portion at a hinge;
an input device having a top surface and a support, wherein the electronic device is positionable against the top surface, wherein the bottom portion is translatable relative to the input device while the support is stationary relative to a support surface below the bottom portion.

17. The computer interface of claim 16, wherein the back portion comprises a first back portion mounted to a back surface of the electronic device and a second back portion pivotally connected to the first back portion and to the bottom portion.

18. The computer interface of claim 16, wherein the support comprises a set of legs extending between the input device and the support surface.

19. The computer interface of claim 16, wherein the electronic device is rotatable relative to the input device while contacting the input device.

* * * * *